UNITED STATES PATENT OFFICE.

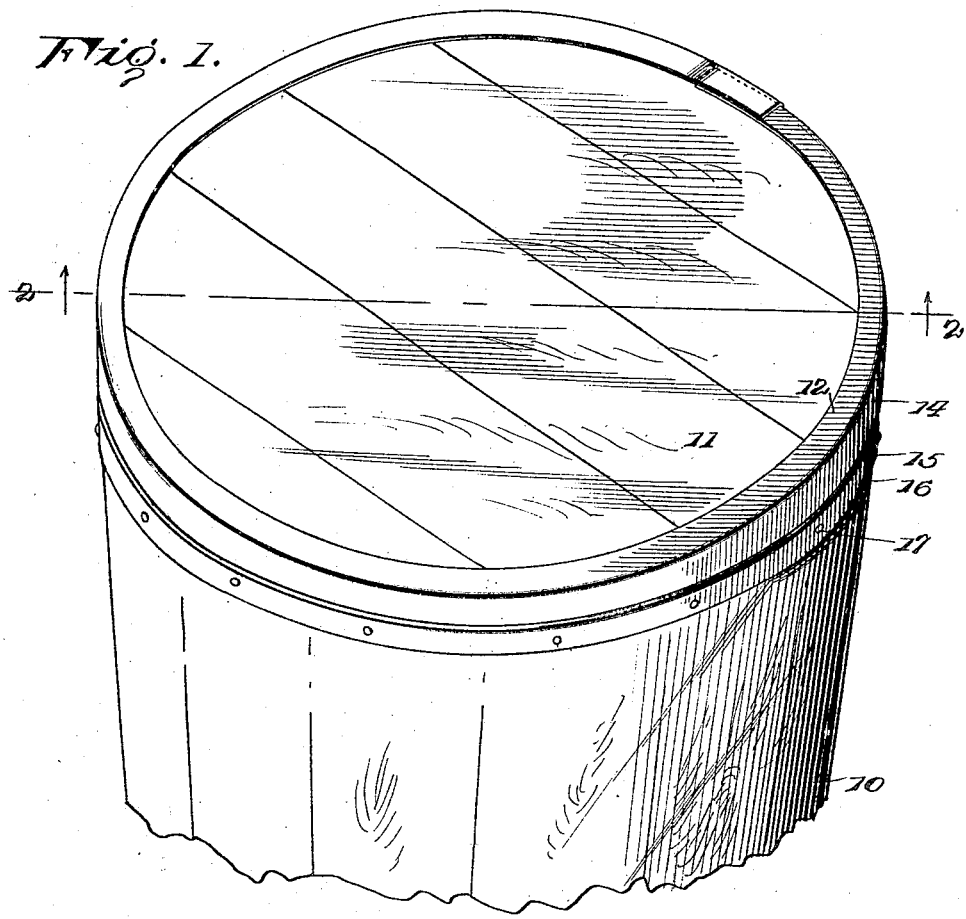
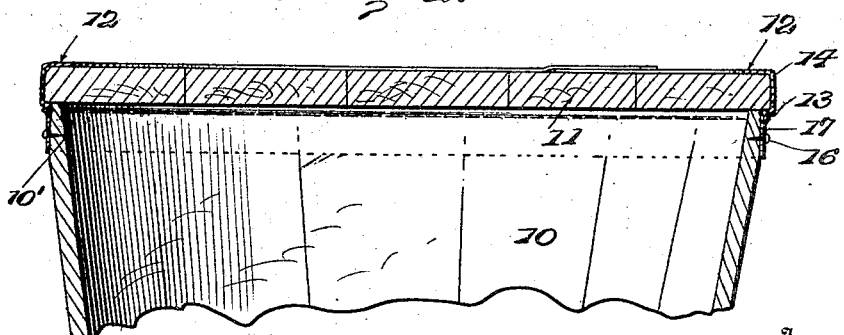

ALBERT F. GUDKNECHT, OF MINNEAPOLIS, MINNESOTA.

SECURING RIM FOR RECEPTACLE COVERS.

1,417,166.    Specification of Letters Patent.   Patented May 23, 1922.

Application filed June 10, 1920. Serial No. 387,827.

*To all whom it may concern:*

Be it known that I, ALBERT F. GUDKNECHT, citizen of the United States, residing at Minneapolis, in the county of Hennepin and State of Minnesota, have invented certain new and useful Improvements in Securing Rims for Receptacle Covers, of which the following is a specification.

This invention relates to an improved securing rim for receptacle covers, being particularly designed for use in connection with butter tubs, and has as one of its principal objects to provide a rim whereby the cover of a butter tub may be quickly and tightly secured upon the tub.

The invention has as a further object to provide a rim which will also serve as a hoop or retaining band for holding the sections or slabs of a tub cover tightly in assembled relation.

And the invention has as a still further object to provide a rim which will be of particularly simple construction, which may be readily applied, and which will dispense with the necessity for the use of wooden cover securing hooks.

Other and incidental objects will appear hereinafter.

In the drawings:

Figure 1 is a fragmentary perspective view showing my improved rim in connection with a butter tub and cover of conventional design, and Figure 2 is a fragmentary transverse sectional view on the line 2—2 of Figure 1, looking in the direction of the arrows.

In order that the construction, mounting and function of my improved securing rim may be accurately understood, I have, in the drawings, shown the device in connection with a butter tub 10 of conventional design, this tub having the usual outer flat face $10^1$ at its upper margin. The cover of the tub is indicated at 11. As will be observed, the cover is, as is usual, formed of a plurality of sections or mating slats and, as particularly shown in Figure 2, the cover slightly overhangs the wall of the tub.

In carrying the invention into effect, my improved rim is preferably constructed of a single piece of suitable sheet metal bent to form an annular band, the ends of the rim overlapping and being suitably secured together. As particularly shown in Figure 2, the rim is formed with a relatively wide top flange 12 and spaced below this flange is an inwardly directed annular gripping bead 13 normally lying substantially parallel to the flange 12 and joined therewith by an intervening connecting portion 14 forming the rim body. The metal of the band is preferably pressed or bent in to define the bead 13 and depending from said bead is an annular skirt or securing flange 16. As will be observed, the rim is formed to snugly fit around the cover 11, the peripheral margin of which is received between the flange 12 and the bead 13. The bead will thus coact with the cover for tightly gripping the rim thereon and holding the flange 12 seated flat against the upper side of the cover, the margin of the cover being clamped between the flange 12 and said bead. Accordingly, the rim will serve to maintain the sections or slats of the cover in tightly assembled relation. Further, by this arrangement it is possible, after the rim has been formed, to readily assemble the sections or slats of the cover therein. As will be perceived, this may be accomplished by simply moving the slats inwardly over the bead 13 to abut the flange 12 when the bead will spring in beneath the ends of the slats for securing the slats upon the rim.

In applying the cover, the flange 16 of the rim is simply fitted over the upper end portion of the tub and the cover moved to abut the upper end edge of the tub. Thus, said flange will be brought into position seating flat against the face $10^1$ of the tub fitting tightly around the upper margin of the tub. A series of nails 17 or other approved fastening devices are then driven through the flange into the wall of the tub for firmly and securely connecting the cover thereto. It will thus be seen that I provide an exceedingly simple and effective device for the purpose set forth. Further, attention is directed to the fact that in the practical use of my improved rim, the nails 17 may, after the tub has reached the consumer, be simply withdrawn for removing the cover when the rim will serve to maintain the cover slats or sections in a unitary structure so that the cover may be readily handled, removed, or replaced.

Having thus described the invention, what is claimed as new is:

1. The combination with a receptacle, and a sectional overhanging removable cover therefor, of a securing rim having an annular rim body surrounding the edge of the cover and provided at one edge with a top flange overhanging the cover and at its opposite edge with an offset extending beneath the cover whereby the rim will hold the sections of the cover assembled when the cover is removed from the receptacle, there being an annular skirt depending from said offset concentric to the rim body but of less diameter to snugly surround the receptacle beneath the cover.

2. As a new article of manufacture, a securing rim for receptacle covers comprising an annular rim body provided at one edge thereof with an overhanging top flange and bent at its opposite edge to define an inwardly directed offset confronting the top flange in spaced substantially parallel relation, there being an annular skirt depending from said offset concentric to the rim body but of less diameter.

In testimony whereof I affix my signature.

ALBERT F. GUDKNECHT. [L. S.]